3,036,081
**4,5-BENZO TRYPTAMINE AND PROCESS
OF PRODUCING SAME**
Gerard Nomine, Noisy-le-Sec, and Lucien Penasse, Paris, France, assignors, by mesne assignments, to Roussel-UCLAF, S.A., Paris, France, a corporation of France
No Drawing. Filed Sept. 12, 1958, Ser. No. 760,535
Claims priority, application France Sept. 18, 1957
4 Claims. (Cl. 260—294.7)

The present invention relates to a new tryptamine compound and, more particularly, to 4,5-benzo tryptamine and to a process of producing the same.

Tryptamine compounds are useful intermediates in the synthesis of physiologically active compounds of the reserpine series.

It is one object of the present invention to provide a new and valuable tryptamine compound, namely 4,5-benzo tryptamine.

Another object of the present invention is to provide a simple and effective process for the production of said new tryptamine compound.

Other objects of the present invention and advantageous features thereof will become apparent as the description proceeds.

In principle, the present invention relates to the new tryptamine compound of Formula I

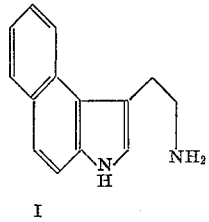

I

The process of producing said new tryptamine compound according to the present invention is illustrated by the following reaction flowsheet:

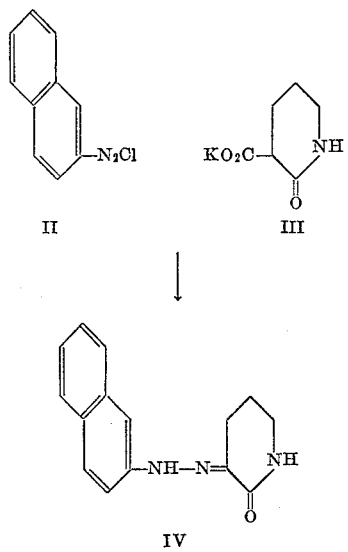

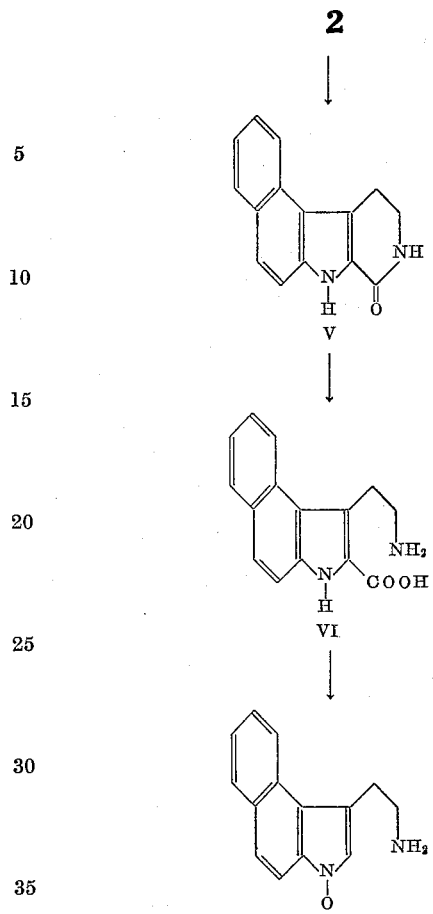

The diazonium salt of β-naphthylamine of Formula II is reacted with 3-carboxy-2-piperidone of Formula III, which is used in the form of its potassium salt. The resulting 3β-naphthyl hydrazone of 2,3-dioxo piperidine of Formula IV is isolated and purified by fractional crystallization. Said hydrazone compound is subjected to the action of methanolic hydrochloric acid whereby cyclization takes place and 5,6-benzo-1,2,3,4-tetrahydro-1-oxo-β-carboline of Formula V is obtained. This compound is saponified by means of an aqueous sodium or potassium hydroxide solution in propylene glycol. The resulting salt of 4,5-benzo tryptamine-2-carboxylic acid of Formula VI is acidified and the free acid is decarboxylated by heating in the presence of hydrochloric acid. After decarboxylation and on rendering alkaline the reaction mixture, the resulting tryptamine compound of Formula I is purified by recrystallization or by other conventional purification methods.

The following example serves to illustrate the present invention without, however, limiting the same thereto. More particularly, the reaction temperature, the nature of the solvents, acids or basic agents used in the reaction, the methods of purification and of isolating the reaction products, and the like, may be varied by those skilled in the art in accordance with the principles set forth herein and in the claims annexed hereto.

The melting points given in the example are instantaneous melting points determined on the Maquenne block.

EXAMPLE

*Preparation of 4,5-Benzo Tryptamine*

10 g. of β-naphthylamine are diazotized at a temperature of about 0° C. in dilute hydrochloric acid with 6.1 g. of sodium nitrite. The resulting diazonium salt solution is added to a solution of the potassium salt of 3-carboxy-2-piperidone obtained by saponification of 11.5 g. of 3-carbethoxy-2-piperidone by means of aqueous potassium hydroxide solution. The pH-value of the reaction mixture is adjusted to a pH of 4.0 by the addition of a few drops of acetic acid and the solution is agitated at 0° C. for 5 hours. It is allowed to stand overnight and is filtered. The filtered precipitate is washed with water and dried in a vacuum. Thereby 12.2 g. (69% of the theoretical yield) of a crude product are obtained which is purified by trituration in boiling ethyl acetate. After cooling with ice, a pink precipitate is obtained which is separated from the solvent and dissolved in 80 cc. of dimethylformamide at 90° C. 20 cc. of water are added to the solution and the mixture is cooled and filtered. Small red crystals of an unidentified by-product are separated. The slightly pink filtrate is mixed with 50 cc. of water and allowed to crystallize. 4.7 g. (38% of the theoretical yield) of a yellow product are obtained. Said compound which represents the 3β-naphthyl hydrazone of 2,3-dioxo piperidine of Formula IV is a new compound. It crystallizes in the form of hexagonal plates which are very soluble in warm dimethylformamide, slightly soluble in alcohol, acetone, and benzene, and insoluble in cyclohexane. It has a melting point of 275° C.

*Analysis.*—$C_{15}H_{15}N_3O = 253.29$. Calculated: 71.12% C; 5.97% H; 16.59% N; 6.32% O. Found: 71.2% C; 6.0% H; 16.8% N; 6.4% O.

Cyclization of the hydrazone compounds obtained as described hereinabove is carried out by passing gaseous hydrochloric acid through a solution of 20 g. thereof in 2,400 cc. of methanol. The reaction mixture is refluxed whereby the color of the solution changes to dark red. The reaction mixture is concentrated to about 800 cc. by distilling off the solvent and the concentrate is allowed to stand overnight at 0° C. The precipitate is filtered off. Long light-brown needles of the hydrochloride of 5,6-benzo-1,2,3,4-tetrahydro-1-oxo-β-carboline are obtained.

In order to set free the carboline base, its hydrochloride is suspended in water and ammonia is added thereto with agitation. After stirring for one hour, 15 g. (80% of the theoretical yield) of a white product are obtained which is recrystallized from alcohol. 12.3 g. (82% of the theoretical yield) of the pure carboline compound of Formula V are obtained. The compound is soluble in hot alcohol and glycol. It has a melting point at 207° C.

*Analysis.*—$C_{15}H_{12}N_2O = 236.26$. Calculated: 76.25% C; 5.12% H; 11.86% N; 6.77% O. Found: 76.4% C; 5.0% H; 11.7% N; 7.1% O.

The compound has not yet been described in the literature.

4,5-benzo tryptamine-2-carboxylic acid of Formula VI is obtained by saponifying 9 g. of the crude benzo carboline compound of Formula V dissolved in 90 cc. of propylene glycol, by means of 321 cc. of aqueous N potassium hydroxide solution. The mixture is refluxed for 3 hours and then neutralized by the addition of acetic acid. The reaction mixture is cooled and allowed to stand in a refrigerator overnight. The precipitated crystals are filtered with suction and washed with water. 9 g. (92% of the theoretical yield) of compound VI are obtained. This new compound crystallizes in the form of fine, colorless needles which are insoluble in most of the organic solvents and soluble in glycols at elevated temperature. Its melting point is 330° C. (with decomposition).

In order to split off carbon dioxide, 10 g. of the amino acid of Formula VI are dissolved in 660 cc. of dilute hydrochloric acid. The reaction mixture is refluxed for 3 hours. The resulting solution is filtered and neutralized by the addition of aqueous sodium hydroxide solution while heating and stirring. Thereby, 4,5-benzo tryptamine of Formula I is precipitated. The mixture is allowed to stand in a refrigerator overnight and the crystals are filtered with suction, washed with water, and dried. 7 g. (85% of the theoretical yield) of the crude tryptamine compound are obtained which is recrystallized from methanol. The new compound crystallizes in the form of colorless long needles which are soluble in alcohol and chloroform and slightly soluble in ether. The compound has a melting point of 196° C.

*Analysis.*—$C_{14}H_{14}N_2 = 210.27$. Calculated: 79.97% C; 6.71% H; 13.32% N. Found: 79.8% C; 6.7% H; 13.1% N.

As stated hereinabove, 4,5-benzo tryptamine is useful as an intermediate in the synthesis of physiologically active compounds of the reserpine series. For instance, said tryptamine compound may be reacted, as described in the process of copending application Serial No. 727,777, filed April 11, 1958, and entitled "20α-Yohimbane Compounds and a Process of Making Same" and other applications with the dextrorotatory methyl ester of 1β-carboxy methyl-2β-methoxy carbonyl-3α-methoxy-4β-acetoxy-6β-formyl-cyclohexane, subjecting the resulting condensation product in a lower alkanol to the action of potassium boronhydride, acetylating, in 18-position, the resulting 9,10-benzo-17α-methoxy-18β-hydroxy-3-oxo-16β-carboxy-2,3-seco-20α-yohimbane compound, heating said 18-ester compound in phosphorus oxychloride to cause ring closure, reducing the resulting unsaturated quaternary ammonium compound by means of zinc, saponifying the 18-acetoxy group, and esterifying the 18-hydroxy group by means of 3,4,5-trimethoxy benzoyl chloride in the presence of pyridine.

We claim:
1. The 3β-naphthyl hydrazone of 2,3-dioxo piperidine.
2. 5,6-benzo-1,2,3,4-tetrahydro-1-oxo-β-carboline.
3. 4,5-benzo tryptamine.
4. 4,5-benzo tryptamine-2-carboxylic acid.

References Cited in the file of this patent

UNITED STATES PATENTS 2,866,788     Pachter _____ Dec. 30, 1958

OTHER REFERENCES

Beilstein: Hand. Org. Chem., 4th ed., vol. XXII, page 567–568 (1935).

Conant and Blatt: The Chemistry of Organic Compounds, 3rd ed., (1947), page 560; The MacMillan Co. Main Work 1–2nd Suppl., page 494 (1953).

Goldsmith et al.: Journ. Org. Chem., vol. 18, pages 507–15 (1953).

Abramovitch et al.: Chemistry & Industry, #40, page 1255 (1955).

Shapiro et al.: J.A.C.S., vol. 77, pages 6690–91 (1955).

UNITED STATES PATENT OFFICE
CERTIFICATE OF CORRECTION

Patent No. 3,036,081　　　　　　　　　　　　　　　　May 22, 1962

Gerard Nomine et al.

It is hereby certified that error appears in the above numbered patent requiring correction and that the said Letters Patent should read as corrected below.

Column 2, lines 27 to 36, the formula should appear as shown below instead of as in the patent:

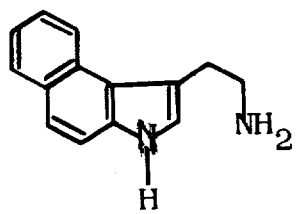

Signed and sealed this 4th day of September 1962.

(SEAL)
Attest:
ERNEST W. SWIDER
Attesting Officer

DAVID L. LADD
Commissioner of Patents